United States Patent
Noehte et al.

(10) Patent No.: US 7,126,729 B2
(45) Date of Patent: Oct. 24, 2006

(54) DOUBLE HOLOGRAM

(75) Inventors: Steffen Noehte, Weinheim (DE);
Matthias Gerspach, Dossenheim (DE);
Christoph Dietrich, Heidelberg (DE);
Stefan Borgsmüller, Heidelberg (DE);
Anna Blazejewski, Hamburg (DE);
Stefan Stadler, Hamburg (DE); Jörn Leiber, Hamburg (DE)

(73) Assignee: Tesa Scribos GmbH, Heidelberg (DE)

( * ) Notice: Subject to any disclaimer, the term of this patent is extended or adjusted under 35 U.S.C. 154(b) by 0 days.

(21) Appl. No.: 10/467,427

(22) PCT Filed: Feb. 1, 2002

(86) PCT No.: PCT/EP02/01069

§ 371 (c)(1),
(2), (4) Date: Sep. 9, 2003

(87) PCT Pub. No.: WO02/063398

PCT Pub. Date: Aug. 15, 2002

(65) Prior Publication Data

US 2004/0066546 A1   Apr. 8, 2004

(30) Foreign Application Priority Data

Feb. 8, 2001   (DE) ................ 101 06 105

(51) Int. Cl.
*G03H 1/00*   (2006.01)
(52) U.S. Cl. .......... 359/2; 359/3; 359/22; 359/30; 359/900

(58) Field of Classification Search ............ 359/30, 359/2, 10, 22, 25, 3, 9, 900
See application file for complete search history.

(56) References Cited

U.S. PATENT DOCUMENTS

| 4,269,473 A | 5/1981 | Flothmann et al. |
| 5,483,363 A * | 1/1996 | Holmes et al. ............ 359/2 |
| 2005/0093856 A1* | 5/2005 | Borgsmuller et al. ...... 345/418 |

FOREIGN PATENT DOCUMENTS

| EP | 0 604 943 A1 | 7/1994 |
| JP | 52-027651 | 3/1977 |
| JP | 62-283385 | 12/1987 |
| JP | 2000-134643 | 5/2000 |
| WO | WO 93/12506 | 6/1993 |

OTHER PUBLICATIONS

Dorsch R.R. et al.: "Fresnel Ping-Pong Algorithm for Two-Plane Computer-Generated Hologram Display", Applied optics, Optical Society of America, Washington, US, Feb. 10, 1994.

* cited by examiner

*Primary Examiner*—Fayez G. Assaf
(74) *Attorney, Agent, or Firm*—Baker & Daniels

(57) ABSTRACT

The invention relates to a method of providing an article with identifying information, in which a hologram is provided from which at least first and second hologram patterns separated physically from each other can be reproduced. In this case, provision is made for the hologram to be produced in such a way that the first and second hologram patterns can generally be reproduced in one and the same direction but in different planes.

20 Claims, 1 Drawing Sheet

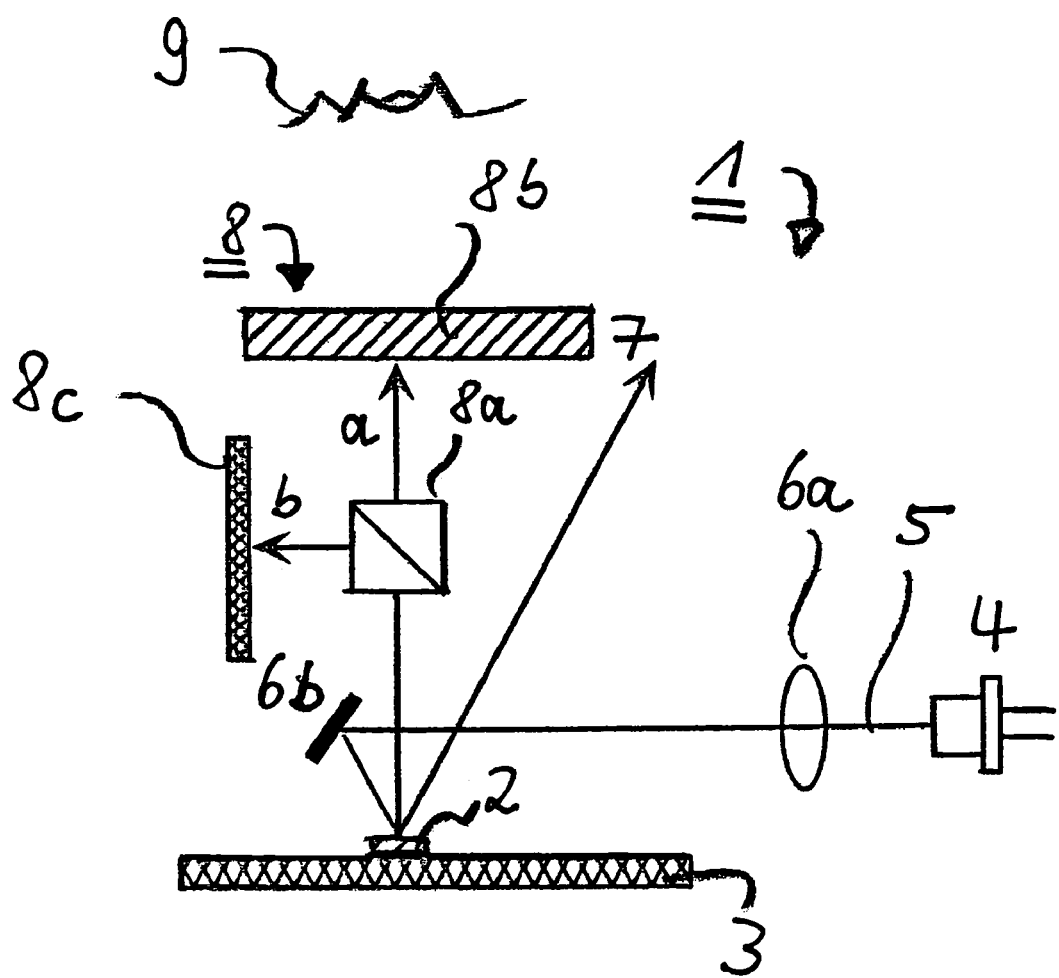

DOUBLE HOLOGRAM

The present invention relates to how identifying can be provided by holograms.

Holograms are already generally common nowadays. In order to be able to identify articles, for example as authentic, there are simple holograms on check cards, identity cards, external packaging, such as for software, entry cards and the like. One problem with conventional holograms is that the holograms often provide security against forgery which is inadequate. Furthermore, the identifying information is often not precise enough in order to identify an individual article, for example.

It has already been proposed to provide holograms on articles, the hologram having a hologram-bearing area which is provided with interference patterns which form a holographic image, and it being possible for different holographic images to be produced in different directions. This, requires light to be radiated in from two different directions and, possibly, for the images to be combined. In this case, the expenditure on apparatus is undesirably high.

The object of the present invention is to provide an innovation for commercial application.

This object is achieved by using the features specified in the independent claims. Preferred embodiments will be found in the subclaims.

The invention thus proposes, firstly, a method of providing an article with identifying information, in which a hologram is provided, from which at least first and second hologram patterns separated physically from each other can be reproduced, the hologram being formed in such a way that the first and second hologram patterns can generally be reproduced in one and the same direction but in different planes.

A first important basic finding of the present invention is to be seen in the finding that particularly expedient identifying information can be provided by hologram patterns being produced in different planes. In this case, it has been recognized that the projected hologram in the first plane does not have to significantly disrupt the reproduction of the hologram pattern separate from this in the second plane if the reading planes are located sufficiently far from each other. As a result of this finding, it has become possible to permit the identification of an article by means of first and second holograms even when light is radiated in from a single direction and, to be specific, even in cases where the area for the hologram can only be small.

In a preferred variant, at least one of the hologram patterns is a machine-readable code. Such a code can, if appropriate, be structured in such a way that its presence cannot readily be detected, for example with the naked eye, even if a projection screen is accidentally moved into the correct plane. This makes it possible to provide on the article identifying information whose presence cannot readily be established.

Provision can further be made for one of the hologram patterns to represent a pattern which can be registered visually. This is advantageous, since the simplest possible article identification is therefore permitted. It should be pointed out that there can be more than just a first and a second hologram pattern that can be reproduced in different planes.

The hologram can be provided on a hologram substrate in such a way that first and second mutually separated regions are provided on the hologram-bearing area. In this case, the subregions used in the first and second hologram pattern can be interleaved with each other in the manner of a checkerboard or combined with each other in a different way.

A combination of this type, in which the information for the first and second hologram pattern is distributed in total over a larger region, already contributes to increasing the scratch resistance and protection against damage.

However, it is preferred for a single region to be provided for the first and second hologram patterns and possibly also for further hologram patterns. This region then bears an interference pattern, from which the different hologram patterns in the different planes may be projected. The determination of suitable such interference patterns per se is known. The iterative calculation of the interference pattern which provides the hologram is preferred. In this context, reference is made, merely by way of example, to the article "Fresnel ping-pong algorithm for two-plane computer-generated hologram display" by R. G. Dorsch et al., in *Applied Optics*, vol. 33, No. 5, page 869 ff.

The interference pattern of the first hologram is preferably determined in such a way that the first and second hologram patterns lie so far apart from each other that they can be read out with different reading means. These different reading means can then, for example, receive light reflected or transmitted through a beam splitter. In an alternative, it is possible to hold a single reading means, for example a projection screen, such that it can be displaced between the two planes.

The hologram itself is preferably produced as a computer-generated hologram by using a single write beam. The article-characterizing information which is provided can be individually characterizing information, such as a portrait of the user of the article, an address, medical data or, for example in the case of a technical article, information which relates to its manufacture.

The write beam can in particular be a laser beam. The use of a double beam from a material, in particular a beam which pre-illuminates over a large area, and a beam which writes point by point in the region pre-heated, for example, by the pre-illumination, is possible.

The hologram can be impressed into a substrate, in particular if a series of articles is to be provided with items of identifying information identical to one another. In the case of interleaving, first parts can be pre-impressed, while other parts can be written individually.

The invention relates further to an apparatus for reading a hologram containing identifying information, such as emerges in particular from one of the method claims, the apparatus comprising a reading light source for the reproduction of the at least first hologram pattern in that direction in which the second hologram pattern can also be reproduced. Therefore, only a single reading light source is required for the reproduction of the two hologram patterns.

In the case of the apparatus, at least one hologram-pattern reproduction means can be fixedly provided, it being possible for this to be, in particular, a projection screen. Furthermore and/or alternatively, a photosensitive field, in particular a CCD, can be provided, in order in particular to register a hologram pattern representing machine-readable code in or close to its focal plane.

If a photosensitive field is provided, it is preferred for the apparatus to comprise a data processing unit, in order to evaluate the pattern registered by the photosensitive field directly in the apparatus.

Protection is also desired for a data medium having an area to accommodate a hologram as claimed in one of the method claims and, respectively, also the use of a data medium to accommodate such a hologram. Particularly suitable data media comprise a polymer material, into which the hologram is introduced. The polymer material can be a pre-oriented polymer material, in particular pre-oriented polypropylene. The article safeguard is produced separately from the article and then arranged on the latter.

The invention will now be described below by way of example, using the drawing, in which:

FIG. 1 shows a sketch relating to reading a hologram according to the invention.

According to FIG. 1, a reader designated generally by 1 for reading a hologram 2 on a hologram substrate which belongs to an article 3, comprises an individual laser 4, whose light beam 5 is deflected onto the hologram 2 by means of suitable optics 6a, 6b, the diffracted light of first order, differing from the light of the zeroth order, passing through optics 8 here, which improves the signal/noise ratio when receiving the diffracted light by means of the early delimitation of the light of zeroth order, but which is not absolutely necessary per se.

The hologram 2 is a computer-generated hologram produced with a single-beam writing device. The interference pattern of the hologram 2 is chosen such that two sharp but different hologram patterns are produced at two different distances from the hologram substrate 3.

The article 3 in the present case is a check card, on which a region of pre-oriented polymer is provided, which bears the hologram 2. The, interference pattern of the hologram in this case extends over the entire area of the hologram substrate.

The laser 4 emits visible light. The visible light is collimated by the lens 6a and radiated in onto the hologram 2 at an oblique angle by a deflection mirror 6b. The oblique irradiation is carried out in such a way that the main reflection of light diffraction of zeroth order 7 does not fall into the further optical arrangement 8 for determining the two hologram patterns encoded in the hologram.

The optics 8 comprise a beam splitter 8a, which is arranged in that direction in which the light diffracted in the first order by the hologram 2 enters.

At a first distance a from the beam splitter 8a there is in the transmission light path a projection screen 8b, the distance a being chosen such that the first hologram pattern is imaged sharply on the projection screen. In addition, in the reflection light path for the light reflected by the beam splitter, there is a CCD array 8c which is arranged at the distance b and which is connected to a detection unit (not shown) for the identification of a machine-readable code. The optical path lengths a and b are different.

The reader 1 is used as follows:

First of all, the article 3 bearing the hologram 2 is arranged with the hologram 2 at the envisaged position and illuminated by the laser 4. The first hologram pattern is then inspected visually on the projection screen 8b, as indicated by the eye 9.

At the same time, without a further laser light source being required, the second hologram pattern is registered on the CCD 8c, and the machine code projected as a result is decoded and checked for its information content.

The advantage with the arrangement is that merely viewing the hologram, even when the first, optically visible hologram pattern is produced, does not permit the fact that a further, machine-decodable hologram pattern is present to be detected.

It should be pointed out that more than two hologram patterns can be encoded; in particular in more than two planes. It should be mentioned that, in addition to visible light, invisible light, in particular from IR laser diodes, is also used.

The invention claimed is:

1. A method of providing an article with one polymer area bearing a hologram as identifying information comprising:
    calculating one computer generated hologram such that at least two sharp patterns can be reproduced therefrom at different distances but into a same direction; and
    writing the computer generated hologram in the polymer area using one single light beam writing device.

2. The method of claim 1, wherein the polymer area comprises two mutually separated regions interleaved with each other.

3. The method of claim 2, wherein first interleaved regions are impressed while other regions are written using the single light beam writing device.

4. The method of claim 3, wherein the computer generated hologram is calculated such that the two sharp patterns lie so far apart from each other that the patterns can be read simultaneously with different reading means.

5. The method of claim 4, wherein said calculating step comprises iteratively determining an interference pattern from which the two, different sharp patterns can be reproduced.

6. The method of claim 3, wherein said calculating step comprises iteratively determining an interference pattern from which the two, different sharp patterns can be reproduced.

7. The method of claim 2, wherein the computer generated hologram is calculated such that the two sharp patterns lie so far apart from each other that the patterns can be read simultaneously with different reading means.

8. The method of claim 7, wherein said calculating step comprises iteratively determining an interference pattern from which the two, different sharp patterns can be reproduced.

9. The method of claim 2, wherein said calculating step comprises iteratively determining an interference pattern from which the two, different sharp patterns can be reproduced.

10. The method of claim 1, wherein the two sharp patterns comprise a first hologram pattern and a second hologram pattern, and wherein the polymer area comprises one single region bearing one interference pattern written by the single light beam writing device for both the first and the second hologram patterns combined.

11. The method of claim 10, wherein the computer generated hologram is calculated such that the two sharp patterns lie so far apart from each other that the patterns can be read simultaneously with different reading means.

12. The method of claim 10, wherein said calculating step comprises iteratively determining an interference pattern from which the two, different sharp patterns can be reproduced.

13. The method of claim 1, wherein the computer generated hologram is calculated such that the two sharp patterns lie so far apart from each other that the patterns can be read simultaneously with different reading means.

14. The method of claim 13, wherein said calculating step comprises iteratively determining an interference pattern from which the two, different sharp patterns can be reproduced.

15. The method of claim 1, wherein said calculating step comprises iteratively determining an interference pattern from which the two, different sharp patterns can be reproduced.

16. The method of claim 1, wherein the polymer comprises a pre-oriented polymer.

17. The method of claim 1, wherein the article is provided with the polymer area after the computer generated hologram is written into the polymer.

18. The method of claim 1, wherein at least one pattern of the two sharp patterns is a machine decodable hologram pattern.

19. The method of claim 1, wherein at least one pattern of the two sharp patterns can be registered visually.

20. The method of claim 1, wherein information identifying the article individually is provided.

* * * * *